United States Patent
Lei et al.

(10) Patent No.: US 12,402,169 B2
(45) Date of Patent: Aug. 26, 2025

(54) METHODS AND APPARATUS FOR BURST-BASED SIDELINK TRANSMISSION

(71) Applicant: Lenovo (Beijing) Ltd., Beijing (CN)

(72) Inventors: Haipeng Lei, Beijing (CN); Xiaodong Yu, Beijing (CN); Zhennian Sun, Beijing (CN); Haiming Wang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 370 days.

(21) Appl. No.: 17/915,315

(22) PCT Filed: Mar. 31, 2020

(86) PCT No.: PCT/CN2020/082423
§ 371 (c)(1),
(2) Date: Sep. 28, 2022

(87) PCT Pub. No.: WO2021/195960
PCT Pub. Date: Oct. 7, 2021

(65) Prior Publication Data
US 2023/0146718 A1 May 11, 2023

(51) Int. Cl.
*H04W 74/0808* (2024.01)
*H04L 1/1607* (2023.01)
(Continued)

(52) U.S. Cl.
CPC ....... *H04W 74/0808* (2013.01); *H04L 1/1607* (2013.01); *H04L 1/1812* (2013.01); *H04W 72/12* (2013.01); *H04W 72/25* (2023.01)

(58) Field of Classification Search
CPC . H04W 74/0808; H04W 72/25; H04W 72/12; H04L 1/1607; H04L 1/1812
See application file for complete search history.

(56) References Cited

U.S. PATENT DOCUMENTS

| 2020/0029340 A1 | 1/2020 | He et al. | |
|---|---|---|---|
| 2020/0351669 A1* | 11/2020 | Xu | H04W 76/14 |
| 2021/0127413 A1* | 4/2021 | Lu | H04W 72/21 |

FOREIGN PATENT DOCUMENTS

| CN | 110383749 A | 10/2019 |
|---|---|---|
| CN | 110637492 A | 12/2019 |

(Continued)

OTHER PUBLICATIONS 20929463.6, "Extended European Search Report", EP Application No. 20929463.6, Oct. 19, 2023, 11 pages.

(Continued)

*Primary Examiner* — Won Tae C Kim
(74) *Attorney, Agent, or Firm* — FIG. 1 Patents (57) ABSTRACT

Embodiments of the present disclosure relate to methods and apparatus for burst-based sidelink transmission. According to an embodiment of the present disclosure, a method for wireless communication includes: performing a first Type-1 channel access procedure for sidelink transmission on a carrier starting from a first candidate starting symbol within a first slot, wherein the first candidate starting symbol is in a set of candidate starting symbols for the sidelink transmission; determining a channel occupancy time (COT) in response to the first Type-1 channel access procedure being successful; and performing, within the COT, the sidelink transmission on the carrier from the first candidate starting symbol within the first slot, wherein the sidelink transmission is contiguous in time domain without any gap.

20 Claims, 7 Drawing Sheets

(51) Int. Cl.
H04L 1/1812 (2023.01)
H04W 72/12 (2023.01)
H04W 72/25 (2023.01)

(56) References Cited

FOREIGN PATENT DOCUMENTS

| | | |
|---|---|---|
| CN | 110731117 A | 1/2020 |
| CN | 110786067 A | 2/2020 |
| CN | 112997412 A | 6/2021 |
| WO | 2018129770 A1 | 7/2018 |
| WO | 2020051415 A1 | 3/2020 |

OTHER PUBLICATIONS

Huawei, et al., "NR frame structure on unlicensed bands", 3GPP TSG RAN WG1 Meeting #93, R1-1805917, Busan, Korea [retrieved Nov. 22, 2023]. Retrieved from the Internet <https://www.3gpp.org/ftp/tsg_ran/WG1_RL1/TSGR1_93/Docs>, May 2018, 8 pages.

Lenovo, "Sidelink Physical layer structures in NR V2X", 3GPP TSG RAN WG1 #98 bis, R1-1910144, Chongqing, China [retrieved Oct. 26, 2022]. Retrieved from the Internet <https://www.3gpp.org/ftp/tsg_ran/WG1_RL1/TSGR1_98b/Docs>., Oct. 2019, 6 Pages.

PCT/CN2020/082423, "International Preliminary Report on Patentability", PCT Application No. PCT/CN2020/082423, Oct. 13, 2022, 5 pages.

PCT/CN2020/082423, "International Search Report and Written Opinion", PCT Application No. PCT/CN2020/082423, Dec. 30, 2020, 6 pages.

Qualcomm, "Cross-slot scheduling power saving techniques", 3GPP TSG-RAN WG1 #98, R1-1909276, Prague, Czech Republic [retrieved Oct. 26, 2022]. Retrieved from the Internet <https://www.3gpp.org/ftp/tsg_ran/WG1_RL1/TSGR1_98/Docs>., Aug. 2019, 16 Pages.

"Foreign Office Action", CN Application No. 20208009927.1, Feb. 21, 2025, 16 pages.

Ericsson, "On RAN1 UE features list for Rel-16 NR", 3GPP TSG-RAN WG1 Meeting #99, Tdoc R1-1913102, [retrieved from the internet on Mar. 10, 2025], <https://www.3gpp.org/ftp/tsg_ran/WG1_RL1/TSGR1_99/Docs>, Nov. 18, 2019, 20 pages.

\* cited by examiner

METHODS AND APPARATUS FOR BURST-BASED SIDELINK TRANSMISSION

TECHNICAL FIELD

Embodiments of the present disclosure are related to wireless communication technology, and more particularly, related to methods and apparatuses for sidelink transmission on unlicensed spectrum.

BACKGROUND

In a wireless communication system, a user equipment (UE), e.g. mobile device, may communicate with another UE via a data path supported by an operator's network, e.g. a cellular or a Wi-Fi network infrastructure. The data path supported by the operator's network may include a base station (BS) and multiple gateways.

In the case that both UEs are relatively close to each other, a radio link or a sidelink can be established between both UEs to provide Device-to-Device (D2D) communication and without going through a direct link to the BS. The term "sidelink" may refer to a direct radio link established for communicating among devices, e.g. UEs, as opposed to communicating via the cellular infrastructure (uplink and downlink) as discussed above. In this case, the "sidelink" is also referred to as a D2D communication link. The D2D communication link may be used in any suitable telecommunication network in accordance with various standards, where the telecommunication network may configure a resource pool to be used by UEs during such D2D communication.

D2D communication has evolved into a vehicle-to-everything (V2X) communication in the Long Term Evolution (LTE) sidelink standard. The V2X communication technology encompasses communication involving vehicles as message sources or destinations. In a new radio (NR) communication system, a transmitting (Tx) UE may send a sidelink transmission to a specific receiving (Rx) UE in a unicast mode, to a group of Rx UEs in a groupcast mode, or to Rx UEs within a range in a broadcast mode.

A UE may operate in both licensed spectrum and unlicensed spectrum. For a transmission on unlicensed spectrum, in order to achieve fair coexistence with other wireless systems, the UE is required to perform a channel access procedure, also named "listen before talk" (LBT) procedure, before the transmission on unlicensed spectrum. In the LBT procedure, the UE performs energy detection on a certain channel. If the detected energy is lower than a predefined threshold, the channel is deemed as empty and available for transmission, and then the LBT procedure is successful. Only when the LBT procedure is successful, the UE can start the transmission on the channel and occupy the channel up to a maximum channel occupancy time (MCOT); otherwise, the UE cannot start the transmission and continue to perform another LBT procedure until a successful LBT procedure. Sidelink transmission may also be performed on unlicensed spectrum.

SUMMARY OF THE DISCLOSURE

According to an embodiment of the present disclosure, a method for wireless communication may include: performing a first Type-1 channel access procedure for sidelink transmission on a carrier starting from a first candidate starting symbol within a first slot, wherein the first candidate starting symbol is in a set of candidate starting symbols for the sidelink transmission; determining a channel occupancy time (COT) in response to the first Type-1 channel access procedure being successful; and performing, within the COT, the sidelink transmission on the carrier from the first candidate starting symbol within the first slot, wherein the sidelink transmission is contiguous in time domain without any gap.

According to another embodiment of the present disclosure, a method for wireless communication may include: detecting, from a first candidate starting symbol of a first slot, a sidelink transmission on a carrier, wherein the first candidate starting symbol is in a set of candidate starting symbols for the sidelink transmission; and in response to the sidelink transmission from the first candidate starting symbol on the carrier being detected, receiving the sidelink transmission from the first candidate starting symbol within the first slot, wherein the sidelink transmission is contiguous in time domain without any gap.

According to yet another embodiment of the present disclosure, an apparatus may include: a non-transitory computer-readable medium having stored thereon computer executable instructions; receiving circuitry; transmitting circuitry; and a processor coupled to the non-transitory computer-readable medium, the receiving circuitry and the transmitting circuitry. The computer executable instructions may cause the processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP (3rd Generation Partnership Project) 5G, 3GPP LTE Release 8 and so on. Persons skilled in the art know very well that, with the development of network architecture and new service scenarios, the embodiments in the present disclosure are also applicable to similar technical problems.

Figure 1:
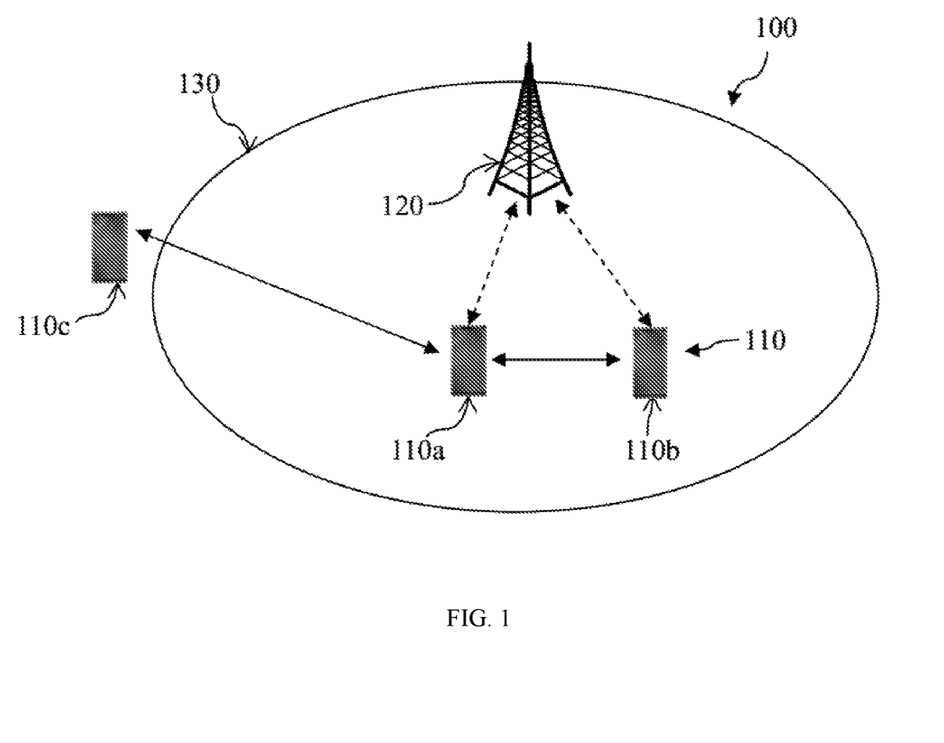
FIG. 1 illustrates a schematic diagram of a wireless communication system according to some embodiments of the present application.

FIG. 1 illustrates a schematic diagram of a wireless communication system 100 according to some embodiments of the present application.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the base station may support communication based on, for example, 3G, long-term evolution (LTE), LTE-advanced (LTE-A), new radio (NR), or other suitable protocol(s). For example, the BS 120 may include an eNB or a gNB. The UE 110a, UE 110b, or UE 110c may include, for example, but is not limited to, a computing device, a wearable device, a mobile device, an IoT (Internet of Things) device, a vehicle, etc. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two base stations 120 with UE 110a being within the coverage of any one of the two base stations 120 means that UE 110a is within the coverage of a base station 120 (i.e., in-coverage) in the wireless communication system; and UE 110a being outside of the coverage of both base stations 120 means that UE 110a is outside of the coverage of a base station 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. During a sidelink communication, a transmitting UE (hereinafter referred to as "Tx UE") may transmit signaling, data, or both to a receiving UE (hereinafter referred to as "Rx UE"). For example, referring to FIG. 1, a Tx UE (e.g., UE 110a) may transmit data to an Rx UE (e.g., UE 110b or UE 110c).

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of carrier frequency. NR-U (NR system access on unlicensed spectrum) operating bandwidth may be an integer multiple of 20 MHz. In order to achieve fair coexistence between NR systems (e.g., NR-U systems) and other wireless systems, a channel access procedure, also known as a listen-before-talk (LBT) test, may be performed, in units of 20 MHz, before communicating on the unlicensed spectrum. For a bandwidth larger than 20 MHz, e.g., 40 MHz, 60 MHz, 80 MHz, or 100 MHz, the carrier bandwidth may be partitioned into subbands, each of which has a bandwidth of 20 MHz and may be indexed.

When unlicensed spectrum is used for sidelink transmission between UEs (e.g., between a Tx UE and an Rx UE), a Tx UE is required to perform an LBT procedure before performing any sidelink transmission. The LBT procedure is performed based on energy detection in each sensing slot. In detail, if the detected energy on one channel in one sensing slot is lower than an energy detection threshold, then the channel is deemed as empty or clear or available in that sensing slot; otherwise, the channel is deemed as occupied or non-available in that sensing slot. For a Type-1 channel access procedure, also named "LBT Category 4 or LBT Cat.4 procedure", usually, the energy detection needs to be performed in a range from several sensing slots to hundreds of sensing slots. A random backoff counter is selected from a contention window at the beginning of the LBT Cat.4 procedure. The random backoff counter will be decremented by 1 each time when the Tx UE detects that the channel is empty in one sensing slot. When the random backoff counter counts down to zero, the channel can be regarded as available and the LBT Cat.4 procedure is successful. Then, the Tx UE can determine a COT not larger than an MCOT and start the sidelink transmission on the channel within the COT. In the LBT Cat.4 procedure, the contention window is continuously updated based on the hybrid automatic repeat request (HARQ)-acknowledgement (ACK) feedback from an Rx UE. The more detailed Type-1 channel access procedure is specified in 3GPP standard document TS37.213. As a result, the time point when the LBT Cat.4 procedure will be successful is unpredictable, and thus the time point when the sidelink transmission can be started is also unpredictable.

For simplicity, sidelink transmission can be restricted to always start from the first symbol of a slot, which typically includes 14 symbols, e.g., symbol 0 to symbol 13. However, such restriction will inevitably cause resource waste unless the Tx UE grabs the channel exactly from symbol 0 of a slot. For example, if the Tx UE grabs the channel from symbol 1 of a slot (i.e., the COT starts from symbol 1 of the slot) and waits for transmission from symbol 0 of the next slot, then a total of 13 symbols (i.e., symbol 1 to symbol 13 of the slot) will be wasted. Hence, it is beneficial to allow multiple starting positions or symbols for sidelink transmission.

On the other hand, the MCOT can have different durations (e.g., a duration of 4 ms in Japan, and a duration of 6 ms, 8 ms or 10 ms in European countries). Accordingly, if the Tx UE does not grab the channel from symbol 0, then it may not end the transmission at symbol 13 in the last slot of the COT. If only the last symbol of a slot, e.g., symbol 13, can be the last symbol of a sidelink transmission, it will also lead to resource waste of the last slot if the whole last slot cannot be occupied due to limitation of MCOT. Hence, allowing multiple ending positions or symbols for sidelink transmission can also reduce or avoid resource waste.

Figure 2A:
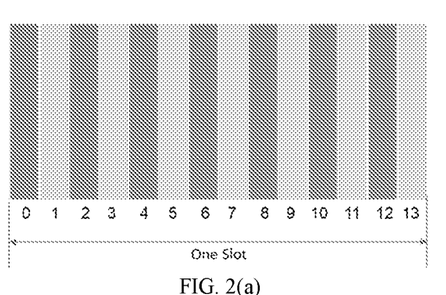
FIGS. 2(a)-2(d) illustrate some exemplary sets of candidate starting positions within a slot for sidelink transmission according to some embodiments of the present disclosure.
Figure 2B:
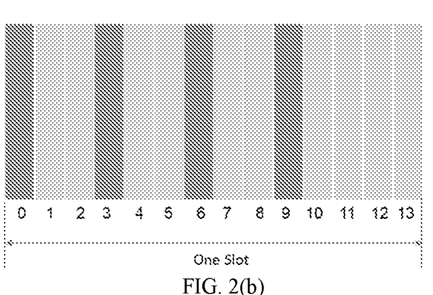
Figure 2C:
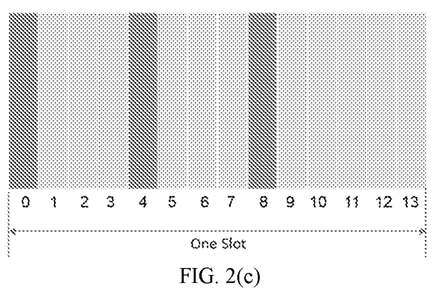
Figure 2D:
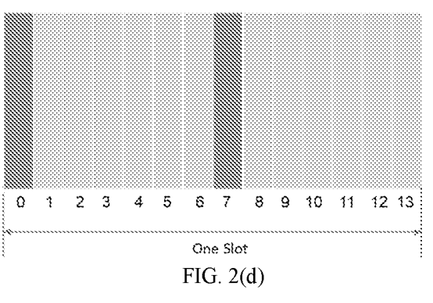

FIGS. 2(a)-2(d) illustrate some exemplary sets of candidate starting positions within a slot for sidelink transmission according to some embodiments of the present disclosure. In FIGS. 2(a)-2(d), dark positions in the slot represent candidate starting positions for sidelink transmission. In a first embodiment as shown in FIG. 2(a), the set of candidate starting positions includes symbols 0, 2, 4, 6, 8, 10 and 12. In a second embodiment as shown in FIG. 2(b), the set of candidate starting positions includes symbols 0, 3, 6 and 9. In a third embodiment as shown in FIG. 2(c), the set of candidate starting positions includes symbols 0, 4 and 8. In a fourth embodiment as shown in FIG. 2(d), the set of candidate starting positions includes symbols 0 and 7. It should be appreciated that other sets including other combinations of candidate starting positions are also applicable. The smallest set of candidate starting positions may include only one symbol of a slot, e.g., symbol 0. The largest set of candidate starting positions may include all symbols of one slot, e.g., symbol 0, 1, 2, 3, . . . , and 13.

The set of candidate starting positions for sidelink transmission may be configured via high layer signaling (e.g., radio resource control (RRC) signaling), e.g., by a base station (such as a gNB) or a Tx UE. A Tx UE may also signal the set of candidate starting positions to the Rx UE via RRC signaling. Additionally or alternatively, the set of candidate starting positions may be preconfigured during implementation or predefined in standards. Selecting the candidate starting positions for a set of candidate starting positions should consider several principles including but not limited to: (1) efficient resource utilization; (2) Rx UE blind detection effort; and (3) channel variation and LBT successful probability between two consecutive candidate starting positions. These principles may be considered alone or in any combination. The more candidate starting positions the set includes, the more efficient resource utilization may be achieved, and the more blind detection efforts the Rx UE needs to make.

Figure 3:
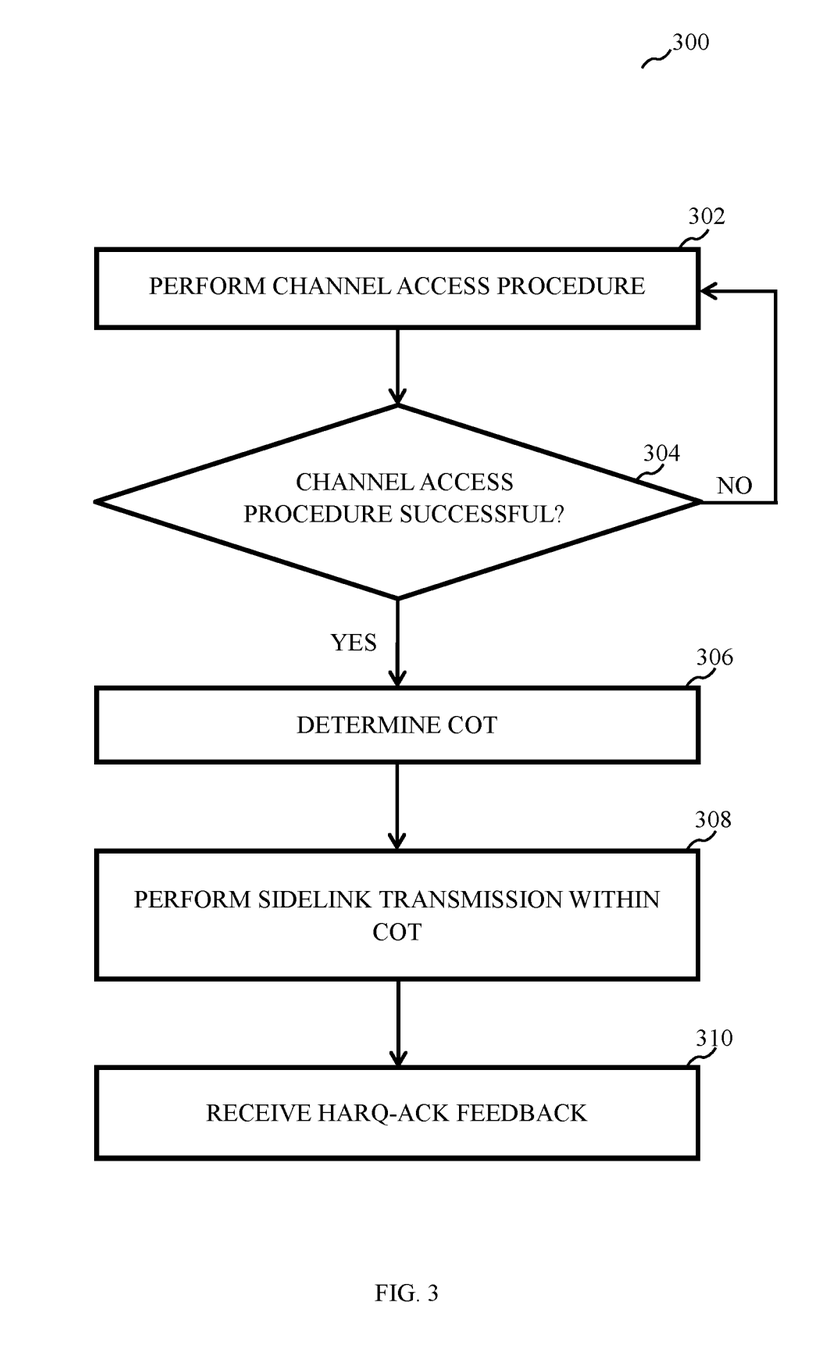
FIG. 3 illustrates a flow chart of a method for sidelink transmission according to an embodiment of the present disclosure.

FIG. 3 illustrates a flow chart of a method 300 for sidelink transmission according to an embodiment of the present disclosure, which may be performed at a Tx UE or other devices having similar functionalities. As shown in FIG. 3, in step 302, a first Type-1 channel access procedure (e.g., a first LBT Cat.4 procedure) for sidelink transmission on a carrier may be performed, e.g., by a Tx UE, before a first candidate starting symbol (e.g., symbol 0) in a set of candidate starting symbols of a slot (e.g., the set illustrated in any of FIGS. 2(a)-2(d)).

When the first channel access procedure is failed (i.e., the "NO" branch of step 304), the method 300 may return to step 302, and a second Type-1 channel access procedure (e.g., a second LBT Cat.4 procedure) for sidelink transmission on the carrier may be performed, e.g., by the Tx UE, before a second candidate starting symbol in the set of candidate starting symbols of the slot. The second candidate starting symbol may be subsequent to the first candidate starting symbol in the set of candidate starting symbols, i.e., the second candidate starting symbol is later than the first candidate starting symbol in time domain. For example, the second candidate starting symbol may be symbol 2 in the embodiment of FIG. 2(a), symbol 3 in the embodiment of FIG. 2(b), symbol 4 in the embodiment of FIG. 2(c), or symbol 7 in the embodiment of FIG. 2(d). In an embodiment of the present disclosure, if the random backoff counter of the first LBT Cat.4 procedure does not count down to zero at the first candidate starting symbol, the first LBT Cat.4 procedure is deemed as being failed and is terminated by the Tx UE immediately. If the second Type-1 channel access procedure is still failed, then a third Type-1 channel access procedure (e.g., a third LBT Cat.4 procedure) for sidelink transmission on the carrier may be performed, e.g., by the Tx UE, before a third candidate starting symbol in the set of candidate starting symbols of the slot, and so on, until a Type-1 channel access procedure is successful for a candidate starting symbol of the slot. If the Type-1 channel access procedure is failed for all the candidate starting symbols of the slot, the Tx UE may perform a Type-1 channel access procedure for each candidate starting symbol of the next slot in the same manner.

If a channel access procedure for any candidate starting symbol of the slot is successful (i.e., the "YES" branch of step 304), the method 300 may proceed to step 306, and a COT may be determined, e.g., by the Tx UE, in response to the successful channel access procedure. Then, in step 308, within the COT, the sidelink transmission may be performed, e.g., by the Tx UE to an Rx UE on the carrier from the candidate starting symbol corresponding to the successful channel access procedure. For example, if the first Type-1 channel access procedure is successful, the Tx UE may perform the sidelink transmission on the carrier from the first candidate starting symbol; and if the second Type-1 channel access procedure is successful, the Tx UE may perform the sidelink transmission on the carrier from the second candidate starting symbol. In step 310, a HARQ-ACK feedback corresponding to the sidelink transmission may be received, e.g., by the Tx UE from the Rx UE.

According to an embodiment of the present disclosure, to avoid the risk of losing the occupied channel, the Tx UE may perform the sidelink transmission in a sidelink transmission burst without any gap in time domain. That is, the sidelink transmission within the COT is contiguous in time domain without any gap.

The sidelink transmission may span across one or more slots within the COT. Within each slot of the one or more slots, the sidelink transmission may include a physical sidelink control channel (PSCCH) and an associated physical sidelink shared channel (PSSCH), which is scheduled by a sidelink control information (SCI) format carried on the PSCCH. The associated PSSCH may have various multiplexing manners with the PSCCH. The SCI format may be used to indicate the starting position of the associated PSSCH to the Rx UE. In an embodiment of the present disclosure, the SCI format carried on the PSCCH may indicate an index of the starting symbol of the associated PSSCH. In another embodiment of the present disclosure, the SCI format carried on the PSCCH may indicate an offset between the starting symbol of the associated PSSCH and the starting symbol of the PSCCH. In yet another embodiment of the present disclosure, the SCI format carried on the PSCCH may indicate an offset between the starting symbol of the associated PSSCH and the ending symbol of the PSCCH. In some other embodiments of the present disclosure, the starting position of the associated PSSCH in the slot is default and not explicitly indicated by the SCI format. According to an embodiment of the present disclosure, the starting position of the associated PSSCH is always the same as the starting position of the PSCCH, that is, the PSCCH and the associated PSSCH start from the same symbol in a slot. For example, in the case that a first Type-1 channel access procedure for a first candidate starting symbol of the slot is successful, the Tx UE may transmit both a PSCCH and its associated PSSCH from the first candidate starting symbol within a slot. According to another embodiment of the present disclosure, the associated PSSCH may be transmitted always immediately following the ending symbol of the PSCCH. According to some other embodiments of the present disclosure, an offset between the starting symbol of the associated PSSCH and the starting symbol or ending symbol of the PSCCH may be configured via RRC signaling, e.g., by a base station (such as a gNB) or Tx UE. The Tx UE may also signal the offset to the Rx UE via RRC signaling. Additionally or alternatively, the offset may be preconfigured or predefined in standards.

In some embodiments of the present disclosure, the SCI format carried on the PSCCH in each slot may indicate the ending position of the associated PSSCH. As discussed above, to save resource, it is beneficial to allow multiple ending positions for sidelink transmission. Thus, the ending position of the associated PSSCH may be selected from a set of candidate ending positions for sidelink transmission.

The set of candidate ending positions for sidelink transmission may be configured via RRC signaling, e.g., by a base station (such as a gNB) or Tx UE. The Tx UE may also signal the set of candidate ending positions to the Rx UE via RRC signaling. Additionally or alternatively, the set of candidate ending positions may be preconfigured during implementation or predefined in standards. Selecting the candidate ending positions for a set of candidate ending positions should consider several principles including but not limited to: (1) efficient resource utilization; (2) Rx UE decoding complexity; (3) channel variation between two consecutive candidate ending positions; (4) reserving a gap in the last slot of the COT for other UEs to perform an LBT procedure; (5) reserving a gap within the COT for a physical sidelink feedback channel (PSFCH) corresponding to the sidelink transmission; and (6) reserving a gap before the PSFCH for a Rx UE to decode the sidelink transmission and/or to perform an LBT procedure for transmitting the PSFCH. These principles may be considered alone or in any combination. The smallest set of candidate ending positions may include only one symbol of a slot, e.g., symbol 13. The largest set of candidate ending positions may include all symbols of one slot, e.g., symbol 0, 1, 2, 3, . . . , and 13. The more candidate ending positions the set includes, the more efficient resource utilization may be achieved, and the more decoding efforts the Rx UE needs to make.

FIGS. 4(a)-4(f) illustrate some exemplary sets of candidate ending positions within a slot for sidelink transmission according to some embodiments of the present disclosure. In FIGS. 4(a)-4(f), dark positions in the slot represent candidate ending positions for sidelink transmission.

Figure 4A:
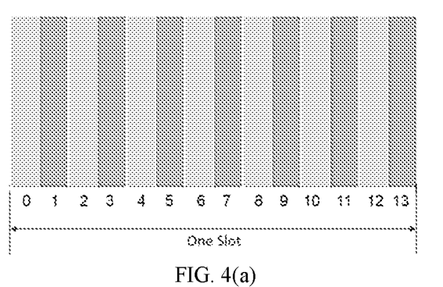
FIGS. 4(a)-4(f) illustrate some exemplary sets of candidate ending positions within a slot for sidelink transmission according to some embodiments of the present disclosure.
Figure 4B:
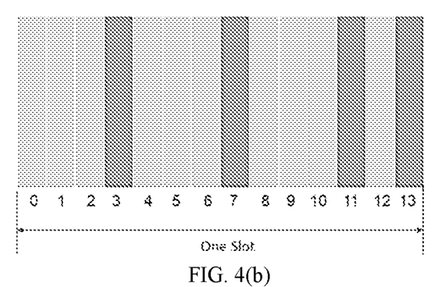
Figure 4C:
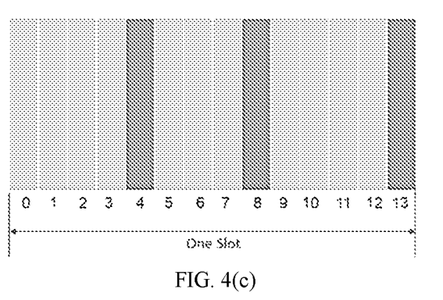
Figure 4D:
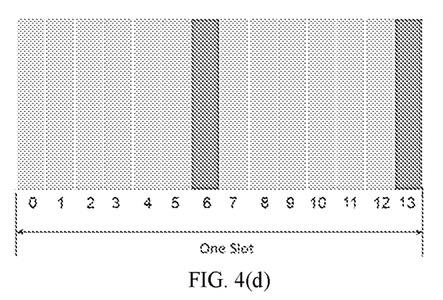

In a first embodiment as shown in FIG. 4(a), the set of candidate ending positions include symbols 1, 3, 5, 7, 9, 11 and 13. In a second embodiment as shown in FIG. 4(b), the set of candidate ending positions include symbols 3, 7, 11 and 13. In a third embodiment as shown in FIG. 4(c), the set of candidate ending positions include symbols 4, 8 and 13. In a fourth embodiment as shown in FIG. 4(d), the set of candidate ending positions include symbols 6 and 13. The embodiments illustrated in FIGS. 4(a)-4(d) consider providing multiple candidate ending positions for more efficient channel usage when selecting the set of candidate ending positions.

Figure 4E:
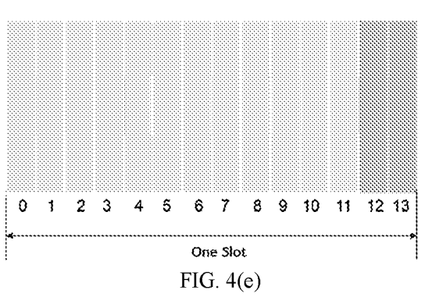

FIG. 4(e) illustrates an embodiment according to the present disclosure for providing multiple candidate ending positions to adapt a gap for other UEs to perform a Type-2 channel access procedure, also named an "LBT Cat.2 procedure", which is an LBT procedure different from the Type-1 channel access procedure. One-shot energy detection within a sensing interval of at least 16 us or 25 us is required for the Type-2 channel access procedure. So there is no random backoff counter generation and decrement procedure in the Type-2 channel access procedure, which is the major difference compared to the Type-1 channel access procedure. The more detailed procedure for the Type-2 channel access procedure is specified in 3GPP standard document TS37.213. As shown in FIG. 4(e), the set of candidate ending positions in a slot may include symbols 12 and 13. If a Tx UE needs to reserve one symbol for other UEs to compete to occupy the channel from the next slot, the SCI format carried on the PSCCH in the slot may indicate symbol 12 as the ending symbol of the associated PSSCH in the slot so that other UEs can perform an LBT procedure in symbol 13; otherwise, the SCI format carried on the PSCCH in the slot may indicate symbol 13 as the ending symbol of the associated PSSCH in the slot.

In the embodiment shown in FIG. 4(e), a gap including only one symbol (e.g., symbol 13) can be reserved for other UEs to perform an LBT procedure. It should be appreciated that different candidate ending positions can be included in the set of candidate ending positions to adapt different gap durations required for performing the LBT procedure. The required gap duration is dependent on a subcarrier spacing value. So the set of candidate ending positions is also dependent on the subcarrier spacing value. For example, in the case of 15 kHz subcarrier spacing and 30 kHz subcarrier spacing, a gap of at least one symbol is required, so the set of candidate ending positions may include symbols 12 and 13. In the case of 60 kHz subcarrier spacing, a gap of at least two symbols is required, so the set of candidate ending positions may include symbols 11 and 13. In the case of 120 kHz subcarrier spacing, a gap of at least three or four symbols is required, so the set of candidate ending positions may include symbols 9, 10 and 13; or include symbols 9 and 13.

Figure 4F:
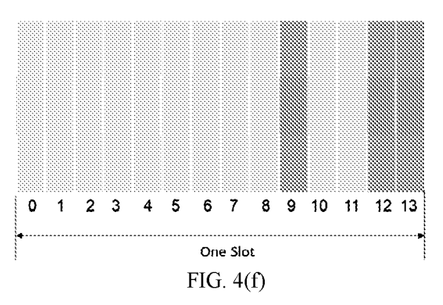

FIG. 4(f) illustrates an embodiment according to the present disclosure for providing multiple candidate ending positions to adapt a first gap for other UEs to perform a Type-2 channel access procedure (e.g., an LBT Cat.2 procedure), a second gap for an Rx UE to transmit a PSFCH, and a third gap for the Rx UE to perform a Type-2 channel access procedure for transmitting the PSFCH.

After receiving the sidelink transmission from a Tx UE, an Rx UE may transmit a HARQ-ACK feedback corresponding to the sidelink transmission on a PSFCH to the Tx UE. To transmit the PSFCH on unlicensed spectrum, the Rx UE also needs to perform an LBT procedure before transmitting the PSFCH. As discussed above, the LBT Cat.4 procedure may results in unpredictable sensing time. The PSFCH may be dropped if the LBT Cat.4 procedure for transmitting the PSFCH is failed or successful with long time sensing. According to an embodiment of the present disclosure, the Tx UE reserves a resource for the PSFCH within the COT initiated by the Tx UE, such that the Rx UE can perform a LBT Cat.2 procedure, which is shorter than the LBT Cat.4 procedure, before transmitting the PSFCH on the reserved resource, and the channel access success probability can be higher. To perform the LBT Cat.2 procedure, the Tx UE may reserve an LBT gap before the resource reserved for the PSFCH.

As shown in FIG. 4(f), the set of candidate ending positions in the slot may include symbols 9, 12, and 13. If a Tx UE needs to reserve both a PSFCH resource in the slot and one symbol for other UEs to compete to occupy the channel from the next slot, the SCI format carried on the PSCCH in the slot may indicate symbol 9 as the ending symbol of the associated PSSCH in the slot so that four symbols are left and not used for transmitting the associated PSSCH. The four symbols can be reserved as a first gap of one symbol (e.g., symbol 13) at the end of the slot for other UEs to perform an LBT procedure, as shown in FIG. 4(e), a second gap of two symbols (e.g., symbols 11 and 12) for the Rx UE to transmit the PSFCH, and a third gap of one symbol (e.g., symbol 10) between the ending symbol (e.g., symbol 9) of the PSSCH and the starting symbol (e.g., symbol 11) of the PSFCH for the Rx UE to perform an LBT procedure. If a Tx UE needs to reserve only one symbol for other UEs to compete to occupy the channel from the next slot, the SCI format carried on the PSCCH in the slot may indicate symbol 12 as the ending symbol of the associated PSSCH in the slot so that other UEs can perform an LBT procedure in symbol 13. If a Tx UE does not need to reserve a PSFCH resource or LBT gap in the slot, the SCI format carried on the PSCCH in the slot may indicate symbol 13 as the ending symbol of the associated PSSCH in the slot.

In the embodiment shown in FIG. 4(f), a gap including only one symbol (e.g., symbol 10 or symbol 13) can be reserved for an Rx UE or other UEs to perform an LBT procedure (e.g., LBT Cat.2 procedure). It should be appreciated that different candidate ending positions can be included in the set of candidate ending positions to adapt different gap durations required for performing the LBT procedure. The required gap duration is dependent on a subcarrier spacing value. So the set of candidate ending positions is also dependent on the subcarrier spacing value. For example, in the case of 15 kHz subcarrier spacing and 30 kHz subcarrier spacing, a gap of at least one symbol is required, so the set of candidate ending positions may include symbols 9, 12, and 13. In the case of 60 kHz subcarrier spacing, a gap of at least two symbols is required, so the set of candidate ending positions may include symbols 7, 11, and 13. In the case of 120 kHz subcarrier spacing, a gap of at least four symbols is required, so the set of candidate ending positions may include symbols 3, 9, and 13.

In the embodiment shown in FIG. 4(f), a gap including two symbols (e.g., symbols 11 and 12) can be reserved for the Rx UE to transmit the PSFCH. It should be appreciated that different candidate ending positions can be included in the set of candidate ending positions to adapt a PSFCH with a different number of symbols.

Any of the first, second, and third gaps described above may be made by puncturing (i.e., the data mapped on each symbol within the gap while not transmitted) or rate-matching (i.e., the data not mapped on each symbol within the gap during the resource mapping procedure).

The Embodiments shown in FIGS. 4(a)-4(f) are provided for illustration purposes. Persons skilled in the art should understand that other sets including other combinations of candidate ending positions are also applicable.

According to some embodiments of the present disclosure, the first N contiguous symbols in the first slot of the sidelink transmission may be used as automatic gain control (AGC) symbols, and other slots of the sidelink transmission do not include any AGC symbol. For example, the first N contiguous symbols are repetition of the next N contiguous symbols in the first slot with one-to-one mapping. Alternatively, each of the first N contiguous symbols is a repetition of the (N+1)$^{th}$ symbol in the first slot. The number of AGC symbols, N, is dependent on the subcarrier spacing value. For example, in the case of 15 kHz subcarrier spacing and 30 kHz subcarrier spacing, at least one symbol is required for AGC purpose. In the case of 60 kHz subcarrier spacing, at least two symbols are required for AGC purpose. In the case of 120 kHz subcarrier spacing, at least four symbols are required for AGC purpose.

Figure 5:
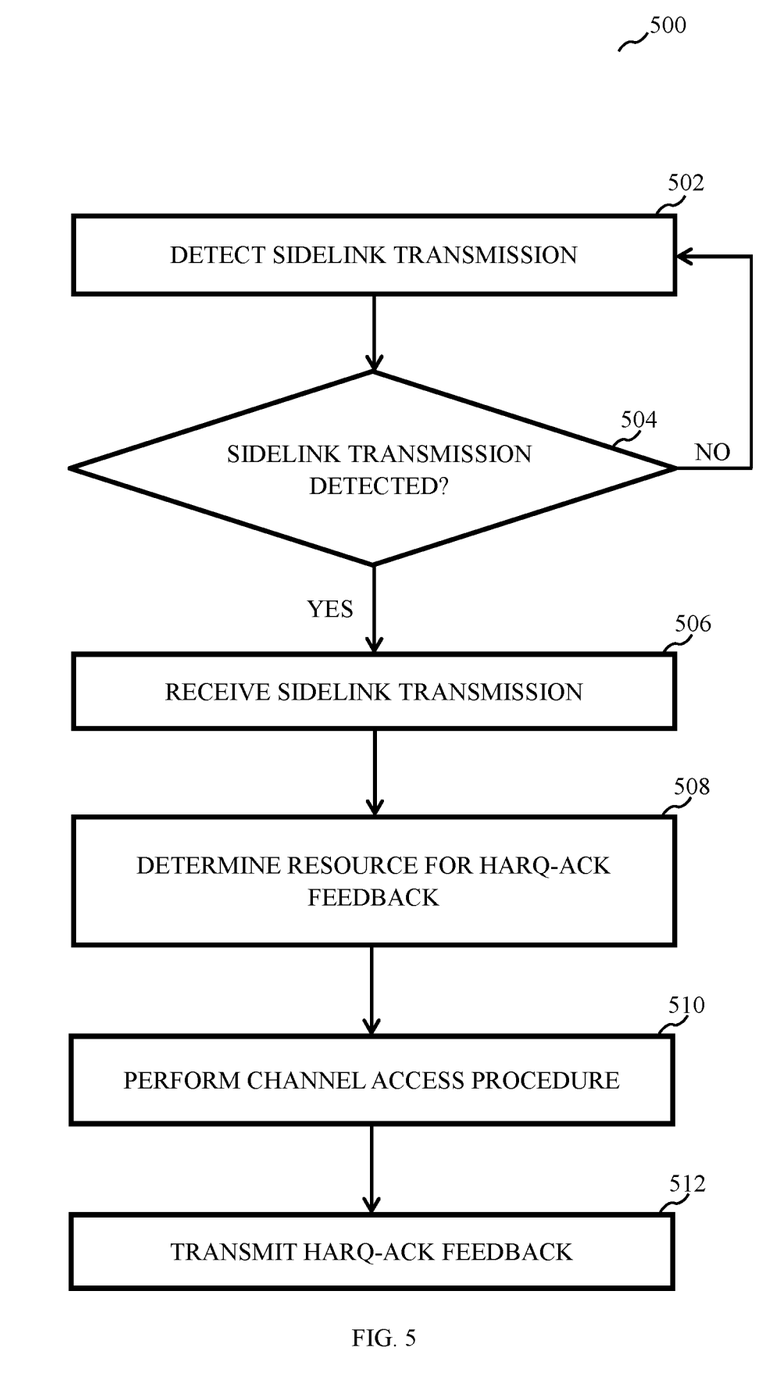
FIG. 5 illustrates a flow chart of a method for sidelink transmission according to an embodiment of the present disclosure.

FIG. 5 illustrates a flow chart of a method 500 for sidelink transmission according to an embodiment of the present disclosure. For simplicity, the method 500 is described below with respect to an Rx UE. It should be understood that the method 500 may be performed by other devices having similar functionalities.

As shown in FIG. 5, in step 502, the Rx UE may perform a blind detection procedure from a first candidate starting symbol (e.g., symbol 0) of a slot to detect a sidelink transmission on a carrier, wherein the first candidate starting symbol is in a set of candidate starting symbols for the sidelink transmission (e.g., the set illustrated in any of FIGS. 2(a)-2(d)). For example, the Rx UE may detect from the first candidate starting symbol whether an SCI format is present. The set of candidate starting positions for sidelink transmission may be configured via RRC signaling, e.g., by a base station (such as a gNB) or Tx UE. The Tx UE may also signal the set of candidate starting positions to the Rx UE via RRC signaling. Additionally or alternatively, the set of candidate starting positions may be preconfigured during implementation or predefined in standards.

If the sidelink transmission starting from the first candidate starting symbol of the slot is not detected (i.e., the "NO" branch of step 504), for example, no SCI format is detected from the first candidate starting symbol, method 500 may return to step 502, and the Rx UE may detect from a second candidate starting symbol in the set of candidate starting symbols of the slot, a sidelink transmission on the carrier. The second candidate starting symbol may be subsequent to the first candidate starting symbol in the set of candidate starting symbols. For example, the second candidate starting symbol may be symbol 2 in the embodiment of FIG. 2(a), symbol 3 in the embodiment of FIG. 2(b), symbol 4 in the embodiment of FIG. 2(c), or symbol 7 in the embodiment of FIG. 2(d). If the sidelink transmission starting from the second candidate starting symbol is still not detected, then the Rx UE may detect a sidelink transmission from a third candidate starting symbol in the set of candidate starting symbols of the slot, and so on, until the sidelink transmission is detected from a candidate starting symbol of the slot. If the Rx UE fails to detect the sidelink transmission from any candidate starting symbol of the slot, the Rx UE may detect the sidelink transmission from each candidate starting symbol of the next slot in the same manner.

If a sidelink transmission starting from a candidate starting symbol of the slot is detected (i.e., the "YES" branch of step 504), for example, an SCI format is detected from the candidate starting symbol, the method 500 may proceed to step 506, and the Rx UE may receive the sidelink transmission from the candidate starting symbol. For example, if the sidelink transmission starting from the first candidate starting symbol is detected, the Rx UE may receive the sidelink transmission on the carrier from the first candidate starting symbol; if the sidelink transmission starting from the second candidate starting symbol is detected, the Rx UE may receive the sidelink transmission on the carrier from the second candidate starting symbol. According to an embodiment of the present disclosure, the sidelink transmission is contiguous in time domain without any gap.

The sidelink transmission may span across one or more slots. Within each slot of the one or more slots, the sidelink transmission may include a PSCCH and an associated PSSCH, which is scheduled by an SCI format carried on the PSCCH. The associated PSSCH may have various multiplexing manners with the PSCCH. The SCI format may indicate the starting position of the associated PSSCH to the Rx UE, and the Rx UE can determine the starting position of the associated PSSCH by decoding the SCI format. In an embodiment of the present disclosure, the SCI format carried on the PSCCH may indicate an index of the starting symbol of the associated PSSCH. In another embodiment of the present disclosure, the SCI format carried on the PSCCH may indicate an offset between the starting symbol of the associated PSSCH and the starting symbol of the PSCCH. In yet another embodiment of the present disclosure, the SCI format carried on the PSCCH may indicate an offset between the starting symbol of the associated PSSCH and the ending symbol of the PSCCH. In some other embodiments of the present disclosure, the starting position of the associated PSSCH in the slot is default and not explicitly indicated by the SCI format. According to an embodiment of the present disclosure, the starting position of the associated PSSCH is always the same as the starting position of the PSCCH, that is, the PSCCH and the associated PSSCH start from the same symbol in a slot. For example, in the case where the sidelink transmission starting from the first candidate starting symbol is detected, the Rx UE may receive both a PSCCH and its associated PSSCH from the first candidate starting symbol within a slot. According to another embodiment of the present disclosure, the associated PSSCH may be transmitted always immediately following the ending symbol of the PSCCH. According to some other embodiments of the present disclosure, an offset between the starting symbol of the associated PSSCH and the starting symbol or ending symbol of the PSCCH may be configured via RRC signaling, e.g., by a base station (such as a gNB) or Tx UE. The Tx UE may also signal the offset to the Rx UE via RRC signaling. Additionally or alternatively, the offset may be preconfigured or predefined in standards.

In some embodiments of the present disclosure, the SCI format carried on the PSCCH in each slot may indicate the ending position of the associated PSSCH, and the Rx UE can determine the ending position of the associated PSSCH by decoding the SCI format. The ending position of the associated PSSCH is in a set of candidate ending positions for sidelink transmission (e.g., the set illustrated in any of FIGS. 4(a)-4(f)). The set of candidate ending positions for sidelink transmission may be configured via RRC signaling, e.g., by a base station (such as a gNB) or Tx UE. The Tx UE may also signal the set of candidate ending positions to the Rx UE via RRC signaling. Additionally or alternatively, the set of candidate ending positions may be preconfigured during implementation or predefined in standards.

Referring back to FIG. 5, after receiving the sidelink transmission, the Rx UE may determine a resource for HARQ-ACK feedback corresponding to the sidelink transmission in step 508. The HARQ-ACK feedback is to be transmitted on a PSFCH to a Tx UE. According to an embodiment of the present disclosure, the resource for HARQ-ACK feedback is reserved within the COT initiated by the Tx UE. For example, symbols 11 and 12 in the last slot of the COT may be reserved for the Rx UE to transmit the PSFCH, as discussed above with reference to FIG. 4(f). It should be appreciated that the PSFCH resource may be reserved in other symbols or other slots within the COT initiated by the Tx UE.

In step 510, the Rx UE may perform a channel access procedure within a gap between the ending symbol of the sidelink transmission and the starting symbol of the resource for HARQ-ACK feedback corresponding to the sidelink transmission which is determined in step 508. In the case where the resource is reserved within the COT initiated by a Tx UE, the Rx UE may perform an LBT Cat.2 procedure within the gap, which needs shorter sensing time and has a higher channel access success probability than the LBT Cat.4 procedure. The number of symbols within the gap is dependent on a subcarrier spacing value of the carrier. For example, in the case of 15 kHz subcarrier spacing and 30 kHz subcarrier spacing, a gap of at least one symbol is required. In the case of 60 kHz subcarrier spacing, a gap of at least two symbols is required. In the case of 120 kHz subcarrier spacing, a gap of at least three or four symbols is required. The gap for the Rx UE to perform an LBT Cat.2 procedure may be reserved within the COT initiated by a Tx UE, e.g., as discussed above with reference to FIG. 4(f).

In response to the channel access procedure being successful, in step 512, the Rx UE may transmit the HARQ-ACK feedback corresponding to the sidelink transmission on the resource which is determined in step 508.

Figure 6:
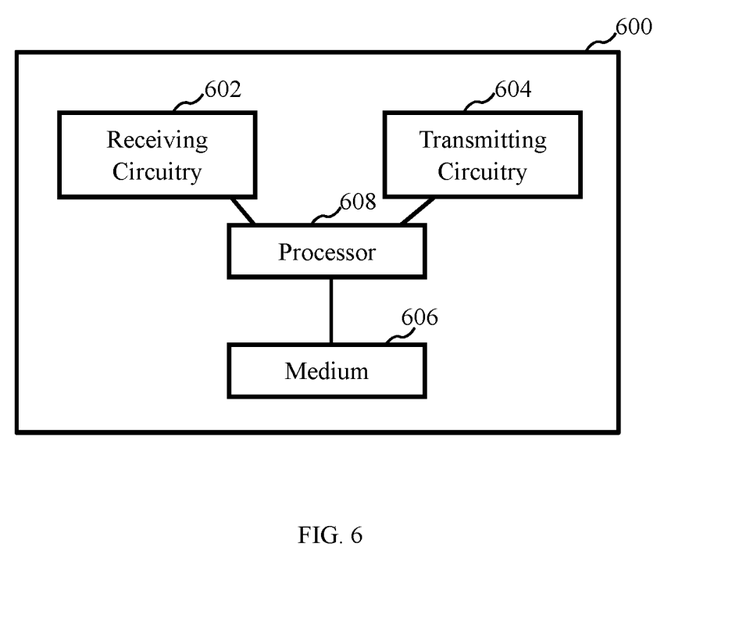
FIG. 6 illustrates an exemplary block diagram of an apparatus according to an embodiment of the present disclosure.

FIG. 6 illustrates an exemplary block diagram of an apparatus 600 according to an embodiment of the present disclosure. In some embodiments of the present disclosure, the apparatus 600 may be a Tx UE or other devices having similar functionalities, which can at least perform the method illustrated in FIG. 3.

As shown in FIG. 6, the apparatus 600 may include at least one receiving circuitry 602, at least one transmitting circuitry 604, at least one non-transitory computer-readable medium 606, and at least one processor 608 coupled to the at least one receiving circuitry 602, the at least one transmitting circuitry 604, the at least one non-transitory computer-readable medium 606.

Although in FIG. 6, elements such as receiving circuitry 602, transmitting circuitry 604, non-transitory computer-readable medium 606, and processor 608 are described in the singular, the plural is contemplated unless limitation to the singular is explicitly stated. In some embodiments of the present disclosure, the at least one receiving circuitry 602 and the at least one transmitting circuitry 604 are combined into a single device, such as a transceiver. In certain embodiments of the present disclosure, the apparatus 600 may further include an input device, a memory, and/or other components.

In some embodiments of the present disclosure, the at least one non-transitory computer-readable medium 606 may have stored thereon computer-executable instructions which are programmed to cause the at least one processor 608 to implement the steps of the methods, for example as described in view of FIG. 3, with the at least one receiving circuitry 602 and the at least one transmitting circuitry 604. For example, when executed, the instructions may cause the at least one processor 608 to perform a Type-1 channel access procedure for sidelink transmission on a carrier starting from a first candidate starting symbol within a slot, and determine a COT in response to the Type-1 channel access procedure being successful. The instructions may further cause the at least one processor 608 to perform the sidelink transmission on the carrier from the first candidate starting symbol with the at least one transmitting circuitry 604. The instructions may further cause the at least one processor 608 to receive a HARQ-ACK feedback corresponding to the sidelink transmission with the at least one receiving circuitry 602.

Figure 7:
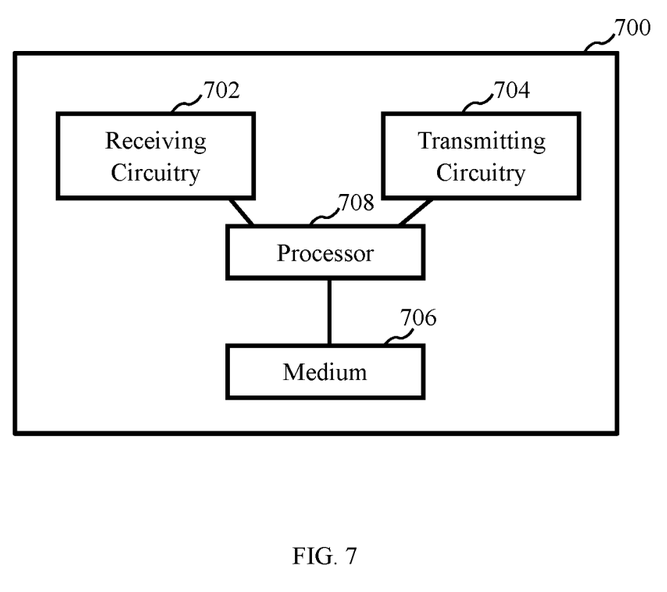
FIG. 7 illustrates an exemplary block diagram of an apparatus according to another embodiment of the present disclosure.

FIG. 7 illustrates an exemplary block diagram of an apparatus 700 according to another embodiment of the present disclosure. In some embodiments of the present disclosure, the apparatus 700 may be an Rx UE or other devices having similar functionalities, which can at least perform the method illustrated in FIG. 5.

As shown in FIG. 7, the apparatus 700 may include at least one receiving circuitry 702, at least one transmitting circuitry 704, at least one non-transitory computer-readable medium 706, and at least one processor 708 coupled to the at least one receiving circuitry 702, the at least one transmitting circuitry 704, the at least one non-transitory computer-readable medium 706.

Although in FIG. 7, elements such as receiving circuitry 702, transmitting circuitry 704, non-transitory computer-readable medium 706, and processor 708 are described in the singular, the plural is contemplated unless limitation to the singular is explicitly stated. In some embodiments of the present disclosure, the at least one receiving circuitry 702 and the at least one transmitting circuitry 704 are combined into a single device, such as a transceiver. In certain embodiments of the present disclosure, the apparatus 700 may further include an input device, a memory, and/or other components.

In some embodiments of the present disclosure, the at least one non-transitory computer-readable medium 706 may have stored thereon computer-executable instructions which are programmed to cause the at least one processor 708 to implement the steps of the methods, for example as described in view of FIG. 5, with the at least one receiving circuitry 702 and the at least one transmitting circuitry 704. For example, when executed, the instructions may cause the at least one processor 708 to detect, from a first candidate starting symbol of a slot, a sidelink transmission on a carrier. In response to the sidelink transmission from the first candidate starting symbol on the carrier being detected, the instructions may cause the at least one processor 708 to receive the sidelink transmission from the first candidate starting symbol with the at least one receiving circuitry 702. The instructions may further cause the at least one processor 708 to determine a resource reserved for HARQ-ACK feedback corresponding to the sidelink transmission, and perform a Type-2 channel access procedure within a gap between an ending symbol of the sidelink transmission and a starting symbol of the resource. The instructions may further cause the at least one processor 708 to transmit, with the at least one transmitting circuitry 704, the HARQ-ACK feedback in response to the Type-2 channel access procedure being successful.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

We claim:

1. A method for wireless communication, comprising:
performing a first Type-1 channel access procedure for sidelink transmission on a carrier starting from a first candidate starting symbol within a first slot, wherein the first candidate starting symbol is in a set of candidate starting symbols for the sidelink transmission;
determining a channel occupancy time (COT) in response to the first Type-1 channel access procedure being successful;
performing, within the COT, the sidelink transmission on the carrier from the first candidate starting symbol within the first slot, wherein the sidelink transmission is contiguous in time domain without a gap;
reserving a resource within the COT for hybrid automatic repeat request (HARQ)-acknowledgement (ACK) feedback corresponding to the sidelink transmission;
reserving a gap between an ending symbol of the sidelink transmission and a starting symbol of the resource; and
receiving the HARQ-ACK feedback within the reserved gap.

2. The method of claim 1, wherein the sidelink transmission within the first slot comprises a first physical sidelink control channel (PSCCH) transmitted from the first candidate starting symbol and a first physical sidelink shared channel (PSSCH), and the first PSSCH is scheduled by a first sidelink control information (SCI) format carried on the first PSCCH.

3. The method of claim 1, further comprising:
performing, in response to the first Type-1 channel access procedure being failed for the sidelink transmission from the first candidate starting symbol, a second Type-1 channel access procedure for the sidelink transmission starting from a second candidate starting symbol in the set of candidate starting symbols; and
performing, in response to the second Type-1 channel access procedure being successful, the sidelink transmission on the carrier from the second candidate starting symbol.

4. The method of claim 3, wherein the second candidate starting symbol is subsequent to the first candidate starting symbol.

5. An apparatus, comprising:
a receiver circuitry;
a transmitter circuitry; and
a processor coupled to the receiver circuitry and the transmitter circuitry, the processor configured to cause the apparatus to:
perform a first Type-1 channel access procedure for sidelink transmission on a carrier starting from a first candidate starting symbol within a first slot, wherein the first candidate starting symbol is in a set of candidate starting symbols for the sidelink transmission;

determine a channel occupancy time (COT) in response to the first Type-1 channel access procedure being successful;

perform, within the COT, the sidelink transmission on the carrier from the first candidate starting symbol within the first slot, wherein the sidelink transmission is contiguous in time domain without a gap;

reserve a resource within the COT for hybrid automatic repeat request (HARQ)-acknowledgement (ACK) feedback corresponding to the sidelink transmission;

reserve a gap between an ending symbol of the sidelink transmission and a starting symbol of the resource; and receive the HARQ-ACK feedback within the reserved gap.

6. The apparatus of claim 5, wherein the sidelink transmission within the first slot comprises a first physical sidelink control channel (PSCCH) transmitted from the first candidate starting symbol and a first physical sidelink shared channel (PSSCH), and the first PSSCH is scheduled by a first sidelink control information (SCI) format carried on the first PSCCH.

7. The apparatus of claim 6, wherein the first SCI format indicates one or more of:
an index of a starting symbol of the first PSSCH;
an offset between the starting symbol of the first PSSCH and a starting symbol of the first PSCCH; or
an offset between the starting symbol of the first PSSCH and an ending symbol of the first PSCCH.

8. The apparatus of claim 6, wherein one or more of:
the first PSSCH is transmitted from the first candidate starting symbol; or
first PSSCH is transmitted following an ending symbol of the first PSCCH.

9. The apparatus of claim 6, wherein one or more of:
an offset between a starting symbol of the first PSSCH and a starting symbol of the first PSCCH is one or more of configured via radio resource control (RRC) signaling, preconfigured, or predefined; or
an offset between a starting symbol of the first PSSCH and an ending symbol of the first PSCCH is one or more of configured via radio resource control (RRC) signaling, preconfigured, or predefined.

10. The apparatus of claim 5, wherein the processor is further configured to cause the apparatus to:
perform, in response to the first Type-1 channel access procedure being failed for the sidelink transmission from the first candidate starting symbol, a second Type-1 channel access procedure for the sidelink transmission starting from a second candidate starting symbol in the set of candidate starting symbols; and
perform, in response to the second Type-1 channel access procedure being successful, the sidelink transmission on the carrier from the second candidate starting symbol.

11. The apparatus of claim 10, wherein the second candidate starting symbol is subsequent to the first candidate starting symbol.

12. The apparatus of claim 5, wherein the processor is further configured to cause the apparatus to use the gap for performing a Type-2 channel access procedure for transmission of the HARQ-ACK feedback.

13. The apparatus of claim 12, wherein a number of symbols within the gap is based at least in part on a subcarrier spacing value of the carrier.

14. An apparatus, comprising:
a receiver circuitry;
a transmitter circuitry; and
a processor coupled to the receiver circuitry and the transmitter circuitry, the processor configured to cause the apparatus to:
detect, from a first candidate starting symbol of a first slot, a sidelink transmission on a carrier, wherein the first candidate starting symbol is in a set of candidate starting symbols for the sidelink transmission;
receive, in response to the sidelink transmission from the first candidate starting symbol on the carrier being detected, the sidelink transmission from the first candidate starting symbol within the first slot, wherein the sidelink transmission is contiguous in time domain without a gap;
detect, from a second candidate starting symbol of the first slot and in response to the sidelink transmission from the first candidate starting symbol on the carrier not being detected, the sidelink transmission on the carrier; and
receive, in response to the sidelink transmission from the second candidate starting symbol on the carrier being detected, the sidelink transmission from the second candidate starting symbol within the first slot, wherein the sidelink transmission is contiguous in time domain without a gap.

15. The apparatus of claim 14, wherein the sidelink transmission within the first slot comprises a first physical sidelink control channel (PSCCH) transmitted from the first candidate starting symbol and a first physical sidelink shared channel (PSSCH), and the first PSSCH is scheduled by a first sidelink control information (SCI) format carried on the first PSCCH.

16. The apparatus of claim 15, wherein the first SCI format indicates one or more of:
an index of a starting symbol of the first PSSCH;
an offset between a starting symbol of the first PSSCH and a starting symbol of the first PSCCH; or
an offset between a starting symbol of the first PSSCH and an ending symbol of the first PSCCH.

17. The apparatus of claim 15, wherein one or more of:
an offset between a starting symbol of the first PSSCH and a starting symbol of the first PSCCH is one or more of configured via radio resource control (RRC) signaling, preconfigured, or predefined; or
an offset between a starting symbol of the first PSSCH and an ending symbol of the first PSCCH is one or more of configured via radio resource control (RRC) signaling, preconfigured, or predefined.

18. The apparatus of claim 14, wherein the second candidate starting symbol is subsequent to the first candidate starting symbol in the set of candidate starting symbols.

19. The apparatus of claim 14, wherein the processor is further configured to cause the apparatus to:
determine a resource reserved for hybrid automatic repeat request (HARQ)-acknowledgement (ACK) feedback corresponding to the sidelink transmission;
perform a Type-2 channel access procedure within a gap between an ending symbol of the sidelink transmission and a starting symbol of the resource; and
transmit the HARQ-ACK feedback in response to the Type-2 channel access procedure being successful.

20. The apparatus of claim 19, wherein a number of symbols within the gap is based at least in part on a subcarrier spacing value of the carrier.

\* \* \* \* \*